United States Patent [19]

Li

[11] Patent Number: 4,618,399

[45] Date of Patent: Oct. 21, 1986

[54] WOBBLE TUBE EVAPORATOR WITH WHIP ROD FLUID DISTRIBUTOR

[76] Inventor: Yao T. Li, Huckleberry Hill, Lincoln, Mass. 01773

[21] Appl. No.: 598,473

[22] Filed: Apr. 9, 1984

Related U.S. Application Data

[63] Continuation-in-part of Ser. No. 367,251, Apr. 7, 1982, Pat. No. 4,441,963, which is a continuation of Ser. No. 201,380, Oct. 27, 1980, abandoned, which is a continuation-in-part of Ser. No. 961,452, Nov. 16, 1978, Pat. No. 4,230,529.

[51] Int. Cl.$^4$ .......................... B01D 1/22; B01D 3/04
[52] U.S. Cl. ........................................ 159/6.2; 159/7; 159/13.2; 159/27.4; 202/175; 202/236; 202/237; 203/10
[58] Field of Search ...................... 159/6.2, 6.1, 43 R, 159/7, 11 A, 11 B, 12, 13 A, 13 C, 15, 25.2, 27 R, 27 D, 28 D; 202/175, 172, 174, 236, 238, 237, 265; 203/72

[56] References Cited

U.S. PATENT DOCUMENTS

| | | |
|---|---|---|
| 3,190,817 | 6/1965 | Neugebauer et al. ............... 159/6.2 |
| 3,265,115 | 8/1966 | Maier ................................. 159/6.2 |
| 3,271,272 | 9/1966 | Watt ................................... 159/6.2 |
| 4,230,529 | 10/1980 | Li ......................................... 159/7 |
| 4,249,989 | 2/1981 | Kalmykov et al. ................ 159/6.2 |
| 4,441,963 | 4/1984 | Li ....................................... 203/72 |

*Primary Examiner*—Wilbur Bascomb
*Attorney, Agent, or Firm*—Kenway & Jenney

[57] ABSTRACT

An evaporation or distillation apparatus uses one or more tubes driven to wobble about a vertical wobble axis that is aligned with the tube. A fluid distributor supplies a fluid to the inner surface of the wobbling tube at its upper end. A flexible whip rod located at least in part within the tube slides around over the inner surface as the tube wobbles. The pressure generated between the wobbling whip rod and the tube spreads the incoming fluid stream into a very thin film having a uniform thickness over the entire length of the tube. In the preferred form the whip rod is anchored at its lower end to a stationary base and is restrained against rotation about its own longitudinal axis, but is sufficiently flexible at its lower end to act as a universal joint. In this preferred form the whip rod has a flexible core surrounded by at least one length of tubular sheathing. The anchor point is preferably centered on either the wobble axis or, where the base is a container wall that moves in unison with the tube, the center of the tube. In the latter form, a fluid distributor mounted on the container above the tube distributes fluid to the tube using the centrifugal force of the wobbling motion to direct the fluid inlet stream. In another embodiment the whip rod is hollow and conducts the fluid to its upper end where the rapid, circular motion of the whip rod distributes the fluid to the inner surface of the tube where it then flows downwardly along the contact line between the whip rod and the tube.

30 Claims, 10 Drawing Figures

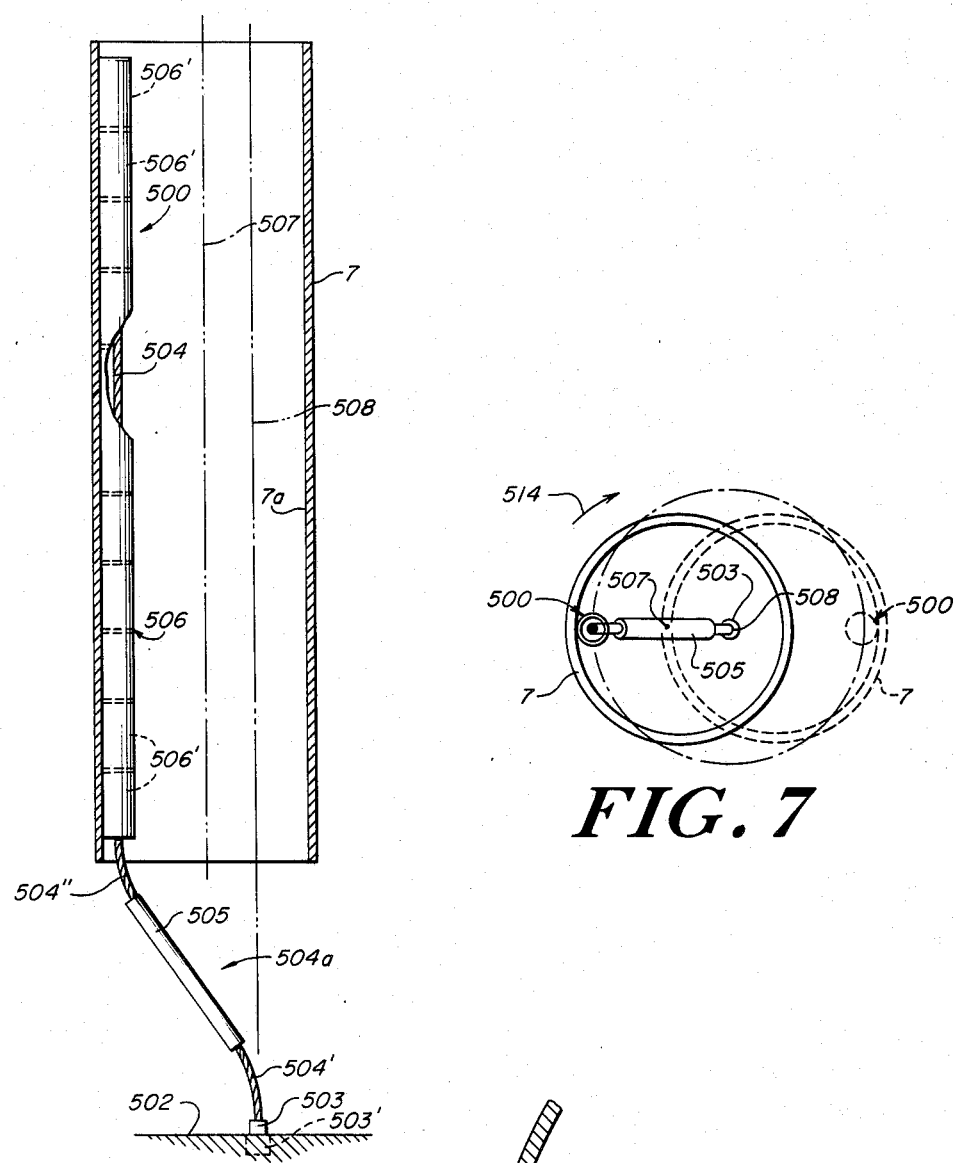
FIG. 7
FIG. 6
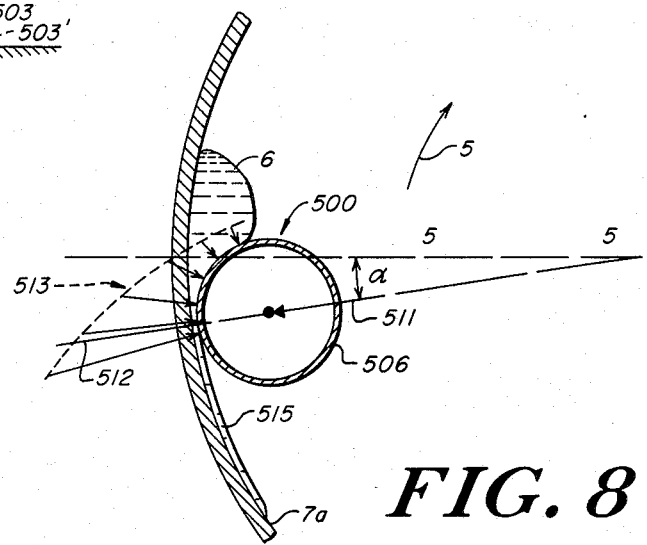
FIG. 8

WOBBLE TUBE EVAPORATOR WITH WHIP ROD FLUID DISTRIBUTOR

REFERENCE TO RELATED APPLICATIONS

This application is a continuation-in-part of U.S. Ser. No. 367,251 filed Apr. 7, 1982 (U.S. Pat. No. 4,441,963), which is a continuation of U.S. Ser. No. 201,380 filed Oct. 27, 1980, now abandoned, which in turn is a continuation-in-part of U.S. Ser. No. 961,452 filed Nov. 16, 1978, now U.S. Pat. No. 4,230,529.

BACKGROUND OF THE INVENTION

This invention relates in general to evaporation and distillation apparatus of the wobble-tube type described in U.S. Pat. No. 4,230,529. More specifically, it relates to an improved evaporator or distillation apparatus of this type which also has a whip rod that spreads the incoming fluid stream into a very thin, even film.

Known apparatus for evaporation or distillation can be used for concentration by removing part of the liquid (as in orange juice), for desalination by condensing the water vapor, or for distillation by separating the various ingredients in the fluid (as in alcohol and water). In all these applications the evaporation (or condensation) of the fluid occurs primarily at the interface between the liquid and its vapor while the needed energy is transmitted from a heat source through the container wall to the liquid and then through the liquid to the interface to support the evaporation.

While the basic concept of distillation of sea water or other fluids, with or without vapor compression, is not new, conventional distillation systems such as multiple stage flash (MSF) systems require a substantial energy input to heat fluids and drive compressors. Additionally there is a substantial temperature gradient per stage which limits the number of usable stages with a given temperature rise or energy input. This correspondingly limits the output. Further, MSF equipment has a high capital cost.

"Falling film" systems are also known where fine spray nozzles produce a downwardly falling thin film of fluid on the side of a vertical or horizontal tube that is stationary. Falling film systems have reduced capital costs and operate more efficiently than MSF systems. However, they have not proven to be reliable. One problem is that the fluid is applied to a heat transfer surface by a number of small nozzles that often malfunction. Also, there is no positive way to assure an even distribution of the thin film and there is a problem in cleaning the scale deposited on the tube by the evaporation.

It is an object of the present invention to reduce the power required and accordingly reduce the operating cost of an evaporation or distillation apparatus.

A further object is to lower the heat resistance of the fluid film being evaporated and reduce temperature differentials.

Another object is to provide a positive mechanical distribution of the fluid into an even, highly thin film without interfering with the introduction of the fluid to the tube.

Still another object is to control the build up of scale or other residue left by the evaporation process on the heat transfer surface.

A further object is to provide a mechanical distribution system with the foregoing advantages that can also serve as a component of a fluid distribution system.

Another object is to provide an evaporation or distillation system with the foregoing advantages that is mechanically simple, has a low cost, is highly reliable, and has a comparatively long operating life.

SUMMARY OF THE INVENTION

Novel evaporation or distillation apparatus according to the present invention comprises wobbling thin-walled tubes to evaporate the fluid flowing inside the wobbling tubes with the heat energy supplied by condensing the stream of vapor which surrounds the outside surface of the tubes. The condensates that form droplets outside the tubes will be thrown off by the wobbling motion and splashed between the tubes to activate further condensation. Thus the wobbling motion of the tube, similar to the circular motion of tea inside a wobbling tea cup, effectively reduces the temperature difference between the vapor outside the tubes and the vapor inside the tubes. Consequently less energy or less equipment is needed for a given task than with conventional equipment. Vapor and fluid interconnections appropriate to the desired evaporation or distillation system are provided.

A whip rod is located within each tube. The wobbling motion of the tube causes the whip rod to slide around the inner surface of the tube to spread the fluid flowing into the tubes into a very thin film that clings to the inner surface and is evenly distributed over the entire length of the tube. In a preferred form the whip rod has a length of flexible core material such as a multiple strand metallic cable. The portion of the cable that spreads the fluid is covered by tubular sheathing. The sheathing can be a continuous length of a resilient material such as silicon rubber. In another form the sheathing can be a set of discrete tubular members of a nonresilient material such as a ceramic. The sheathing material is selected to withstand constant abrasion during operation, and to remove scale as it grows on the inner surface. The whip rod is sufficiently stiff that it is limp within the tube when the tube is not wobbling, but it is sufficiently flexible to assume a generally vertical orientation that is parallel to the wobble axis during operation. The whip rod is also sufficiently flexible that the centrifugal force developed by the rotation allows the rod to conform to minor surface irregularities of the inner surface to produce an even film.

Also, in the preferred form the whip rod is anchored at its lower end to a base. If the base is a stationary reference member, for example part of an outer enclosure, then the anchor point is preferably at or near the wobble axis. If the base wobbles in unison with the tubes, then the anchor point is preferably at or near the vertical center line of the tube. In the preferred form the lower end of the whip rod is secured against rotation about its own longitudinal axis. The whip rod has sufficient flexibility over its lower portion extending from the tube to the anchor point to provide a universal joint. Preferably a stiffener tube surrounds a portion of the flexible core over this lower portion of the whip rod. The universal joint allows the whip rod within the tube to rotate over the inner surface driven by the wobble motion. The whip rod can also be mounted to an actual universal joint supported on the base. In another form, the whip rod can be mounted to pivot about the base, although this does not produce even wear. With the mounting arrangement a whip rod with a non-circular cross section may be preferred.

In other forms the whip rod is a one piece member or a hollow, flexible tube. In this hollow form, a supply of the fluid to be evaporated can be connected under pressure to the lower end of the whip rod. The pressure is adjusted so that in normal operation a steady stream of the fluid is thrown from the upper end of the whip rod onto the inner surface. If the container wobbles with the tube, the fluid distribution system can include a tube and distribution head mounted on the container above and centered on the tube. The centrifugal force of the wobbling motion then directs the inlet fluid stream within the tube in connection with the whip rod but without a mechanical coupling between the fluid distribution system and the wobble tube.

BRIEF DESCRIPTION OF THE DRAWINGS

The invention and its various features may be more fully understood from the following description in conjunction with the accompanying drawings in which:

FIG. 6 is view in side elevation, with portions broken away, of a wobble tube and a whip rod fluid distributor according to the present invention mounted within the tube;

FIG. 7 is a top plan view of the wobble tube and whip rod shown in FIG. 6;

FIG. 8 is a detailed view of the whip rod shown in FIGS. 6 and 7 with emphasis on its interaction with the inlet fluid stream to form a uniform, very thin fluid film on the inner surface of the tube;

DETAILED DESCRIPTION OF THE PREFERRED EMBODIMENTS

Figure 1:
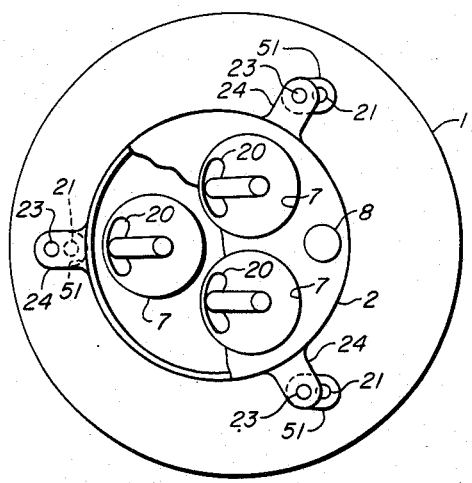
FIG. 1 is an end plan view of a wobbling evaporator.

FIG. 1 shows the end view of a generalized wobbling evaporator which consists of an outer shell 1 and a wobbling container 2. Three heat transfer tubes 7 are shown to perform the evaporation and condensation operation. In actual construction several dozens of tubes may be installed in one container.

Three brackets 24 are attached to the ends of the container 2. Three cranks 51 together with three sets of shafts 21 and 23 bearings 22 and 24 are used to guide the container 2 to revolve in the wobbling motion. A motor (not shown) may be used to drive any one of the three shafts 21 to wobble the container 2 as shown in the drawing container 2 is pivoted to arms 51 connected to shafts 21. Thus when any one or more of the three shafts 21 are rotated, the pivot points 23 on container 2 travel through circles defined by the arms 51. The rotation of the points 23 through these small circles causes the container 2 to perform a wobbling motion.

Figure 2:
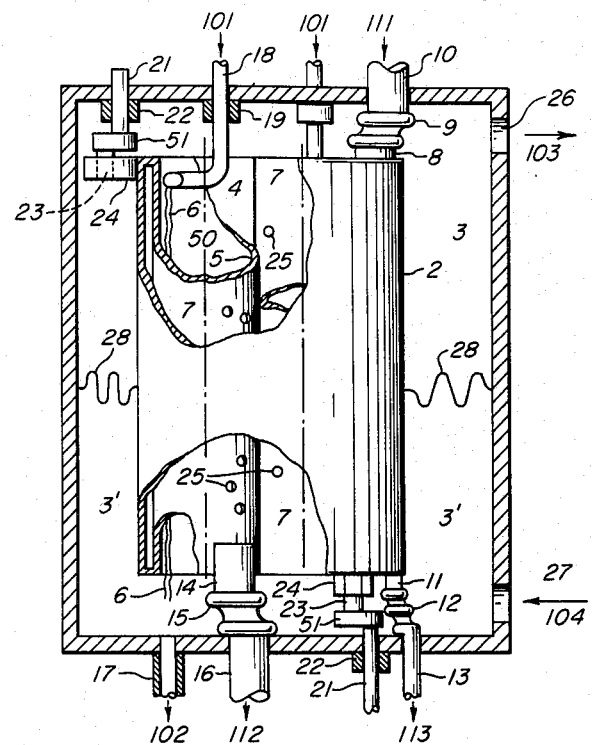
FIG. 2 is an elevation view, with cut out sections, of a wobbling evaporator.

Referring now to FIG. 2, fluid to be evaporated is represented by arrow 101 which flows into tube 18 which revolves in bushing 19. The center of bushing 19 is also the center of wobbling for tube 7. Thus, the wobbling motion of tube 7 will drive the "L" shaped pipe 18 to revolve in the bushing 19 and discharge the fluid from the head 20 at the far side of the tube 7 from the wobbling center.

The fluid discharge from head 20 becomes fluid stream 6 which revolves inside tube 7 and discharges into chamber 3' and then flows out through pipe 17 as represented by arrow 102.

Tube 7 wobbles but does not revolve. Thus the revolving stream 6 coats the inside surface of tube 7 with a film 5 which evaporates into vapor and escapes from the two ends of tube 7. The upper ends of tube 7 connect to chamber 3 and exit through opening 26 as arrow 103. Likewise, the lower end of tube 7 opens to chamber 3' and exits through opening 27 as arrow 104. Chambers 3 and 3' are separated by flexible barrier 28. In certain applications arrow 103 and arrow 104 may be arranged to have one flowing inward while the other is flowing outward to achieve continuous circulation and to help the evaporation. In some other cases the flexible barrier 28 is omitted so that only one exit is sufficient to bring the vapor out. The detailed arrangement of specific applications is discussed below.

High temperature vapor 111 will be introduced from inlet pipe 10 through flexible coupling 9 and pipe 8 into the inside chamber 4 of container 3. In contact with the coupler tube 7 the vapor will condense into droplets 25 which splashes inside chamber 4 against the outside surface of tubes 7 and thereby increases the condensation rate. Finally, the condensation will be collected near the bottom edge of chamber 4 and discharged through pipe 11, flexible coupling 12 and drain pipe 13 to become distillate 113. A second vapor passage 14-15-16 with vapor 112 is shown at the lower end of the system. This double ended vapor passage arrangement is needed in the distillation column described in the aforementioned U.S. Pat. No. 4,230,529 (and particularly FIG. 7 thereof), but is not essential for the desalination system described in conjunction with FIG. 6 of U.S. Pat. No. 4,230,529.

Figure 3:
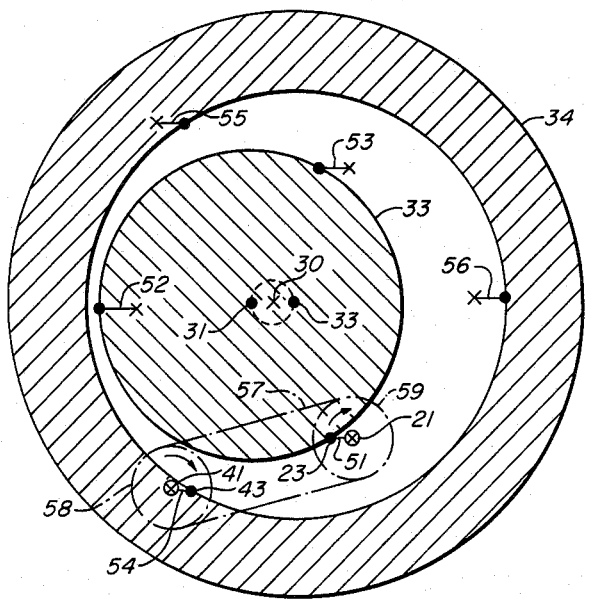
FIG. 3 is an end plan view of two concentric wobbling evaporators to achieve dynamic balancing.

The wobbling drive of FIGS. 1 and 2 exhibits a revolving centrifugal force of the center of mass with respect to its wobbling center. FIG. 3 shows one way to balance the revolving forces by having two sets of concentric wobbling systems with the two mass centers 31 and 32 opposite to each other with respect to their common wobbling center 30. 31 is the mass center of the inner system 33 which is guided by three cranks 51, 52 and 53. 32 is the mass center of the outer system 34 and is guided by three cranks 54, 55 and 56. Both systems have the same wobbling center 30. Two gears 58 and 59 coupled by chain 57 are used to maintain the proper orientation of the two systems. U.S. Pat. Nos. 4,230,529 and 4,441,963 describe other more sophisticated arrangements for producing a dynamic balance of the tubes and other moving components during wobbling. By way of example, using water as the fluid being evaporated, typical design parameters are 2" diameter copper heat transfer tube with a wobbling radius in excess of $\frac{1}{2}$", a revolving speed in excess of 150 R.P.M. and a flow rate of about 1 lb/min.

In the apparatus described above, which is also described in U.S. Pat. No. 4,230,529, the fluid stream 6 revolves around the inside of the wobbling tube 7 as a sharp wave front with a following, tapering off wedge which in turn is followed by a tail end which is the film 5. The thickness of the film, which is a critical parameter in the operational efficiency of the apparatus, is primarily a function of the surface tension and adhesion of the liquid. Other factors such as the material, dimensions, smoothness and wobble parameters of the tube and the size and configuration of the wave front are also factors, but under normal circumstances less dominant factors. In any event, there is no positive control over the thickness of the film and it does vary over the inner surface.

Figure 4:
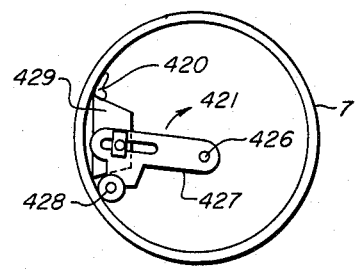
FIG. 4 is a schematic end view of apparatus for use with high viscosity fluids.
Figure 5:
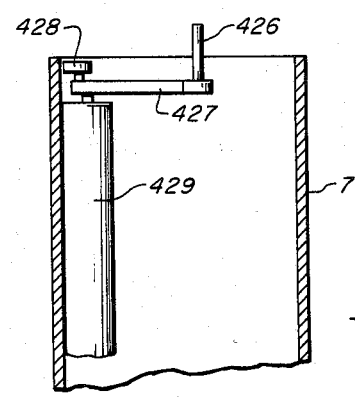
FIG. 5 is an elevation view of the apparatus of FIG. 4.

Because of the importance of the characteristics of the fluid, fluids with high viscosities such as fruit juices have proved difficult to handle in ordinary wobble tube evaporators. FIGS. 4 and 5 show an arrangement described in applicant's aforementioned U.S. Pat. No. 4,441,963 using the wobbling drive to handle fluid with higher viscosity. This is accomplished with a heavy, rigid bar 429 which is hung under a revolving arm 427 pivoted at shaft 426 and engaged to the inside surface of a tube 7 via roller 428. This heavy bar 429 pushes fluid 420 in front of it as it revolves on the direction of arrow 421 to generate a film to facilitate the evaporation.

This rigid revolving bar does reduce the thickness of the film 5 formed by high viscosity fluids as compared to the ordinary situation where the swirling motion, with no mechanical spreader, produces the film. However, it is not satisfactory for low viscosity fluids, for example, those with a Reynold's number near that of water. One problem is that the mounting for the bar 429 at the upper end of the tube will interfere with most fluid distribution systems since they are located at the same place. Another problem is that the bar 429 is rigid and therefore cannot match variations in the smoothness of the inner surface. As a result, the film formed between the inner surface and the rigid bar will vary in thickness. Also, because only one side of the bar engages the inner wall of the tube and the fluid, wear occurs on the same surface or surfaces. Another limitation of this rigid bar is that the spacing between the bar and the tube is fixed and therefore the pressure exerted by the bar on the fluid stream to form the film is substantially constant. The rotating rigid bar also requires a bearing than can withstand the substantial forces produced by a rapidly rotating bar pushing a fluid mass. The present improvement invention overcomes all of these difficulties.

Turning now to FIGS. 6–10, a principal feature of the present improvement invention is a mechanical distributor in the form of a whip rod 500 that acts in cooperation with the inner surface 7a of a wobbling tube 7 to distribute an incoming fluid stream 6 into a uniformly distributed, very thin film 515. The tube 7 wobbles above a stationary base 502 which may be a portion of a housing, a support member, or a cannister that is integral with the tube 7 and wobbles in unison with it.

In a preferred form shown in FIGS. 6–8 the whip rod 500 that has a flexible core 504 surrounded by a tubular sheath 506 over the portion of the whip rod lying within the tube 7. The core is preferably formed of a material that has good tensile strength, resistance to fatigue, and is at least somewhat flexible. The core should also have a sufficient density and mass per unit length that the desired wobbling motion will produce a lateral force on the fluid stream that is large enough (typically 3 g to 4 g) to produce the very thin film 515. Multiple strand metallic cable, for example a steel cable having a diameter of about ⅛ inch, is suitable. The sheathing 506 can be formed of any material that can engage the incoming fluid stream 6 and in cooperation with the inner surface 7a spread it into the film 515. In a preferred form the sheathing is a continuous length of a flexible material such as silicon rubber that extends substantially the full length of the tube. The sheathing can also be formed from a set of short tubular sections 506' shown in phantom in FIG. 6. This latter arrangement allows the use of rigid materials such as ceramics which can exhibit better wear characteristics or which may be more abrasive to enhance the removal of scale or other evaporation residue from the inner surface 7a. It is also possible to use a whip rod with no discrete sheathing member 506, but rather a one-piece rod of the core material or the core material impregnated with a material to produce a smooth outer surface. A multiple strand metallic cable impregnated with rubber is an example of this latter form.

In the preferred form, the whip rod is anchored to the base by an upright flange 503 that is welded, cemented, riveted, or otherwise secured to the lower end of the cable 504 and to the base. The flange 503 does not allow the cable 504 to rotate about its own longitudinal axis. The anchor point is preferably coincident with the wobble axis 508 of the tube when the base 502 is a reference member that is stationary during operation such as the shell 1, although it is not essential that they be in exact alignment.

The lower end of the whip rod is a portion 504a of the flexible cable 504 that extends from the lower end of the tube to the flange 503 and the base 502. A rigid sleeve or stiffener 505 surrounds a central region of this lower portion 504a leaving two comparatively flexible portions 504' and 504" that act as a universal joint between the anchor point and the less flexible upper portion of the whip rod that includes the sheathing 506. The stiffener 505 reduces the bending angle of the cable at the portions 504' and 504" which reduces fatigue, promotes the wobbling movement of the whip rod, and assists in holding the whip rod in position within the tube. While the whip rod must be flexible, it also must be sufficiently stiff so that the downward force of gravity (1 g) causes it to lean limply against the inner surface of the tube. When the tube wobbles, the upper whip rod straightens and aligns itself along the inner tube surface opposite the wobbling axis as shown in FIGS. 6 and 7. In particular, FIG. 7 shows two diametrically opposite positions of the tube 7 during one wobble cycle, one in solid line and one in phantom, as well as corresponding position of the whip rod. As should be clear, the circular wobbling motion whips the flexible rod 500 to revolve with respect to the tube. The universal joint arrangement described above allows this revolution. The fixed anchor resists rotation of the rod about its own axis so that the outer sheathing 506 wears evenly.

FIG. 8 shows the force/pressure equilibrium condition when the tube wobbles. The wobbling motion is represented by a clockwise arrow 514. The whip rod 500 places itself with a lagging angle $\alpha$ with respect to a radial line through the tube center 507 and the wobbling center 508. The incoming water stream 6 is pushed by the whip rod to move ahead of the rod as shown.

A hydroplane effect occurs which is illustrated by the pressure distribution profile 513 that yields a resultant force 512 which is balanced against a centrifugal force 511 produced by the revolving whip rod. In essence, water is forced through a "funnel" formed by the whip rod and the inside surface of the tube and exits as the thin film 515. The flexibility of the whip rod is important to alow the rod to comform to minor variations on the inner surface of the tube. Preferably the flexibility should be sufficient to follow variations in the diameter of the inner tube surface of ½ mil over a tube length of 5 inches. It is also significant that the pressure generated by the whip rod is less dependent on the rigidity of the rod than in the arrangement shown in FIGS. 4 and 5.

The thickness of the film is controlled by the centrifugal force of the rod, the viscosity of the fluid, and the curvature of the rod. It is most significant that the whip rod 500 can create a thinner film, other factors being the same, than that produced without the positive control of the whip rod. More specifically, with low viscosity fluids such as water the present improvement invention can reliably produce films with a thickness of less than 0.001 inch (1 mil). This very thin film can double the heat transfer achievable by prior wobble-tube evaporation or distillation systems that do not use the whip rod 500. This provides a major improvement in the operational efficiency of the apparatus.

Another major advantage of the whip rod arrangement, as compared both to the "falling film" apparatus and applicant's earlier wobble tube designs, is that is removes scale and other residue of evaporation from the inner surface of the tube. While the mechanism of this cleaning process is not known fully, it appears that scale grows from solutes in the fluid as a crystal structure, the growth beginning at a nucleation point on the inner surface 7a. Before the scale can grow together from multiple nucleation points into a "patch" that is very difficult to remove, it appears that the growing scale becomes tall enough to project above the very thin film 515, which may have a typical thickness of ½ mil. When the scale projects above the film, it is struck by the whip rod as it slides over the surface 7a and dislodged. In practice, a tubular silicon rubber sheathing 506 has kept the surface 7a mirror clean even after prolonged operation with ordinary water. For other fluids such as sea water the wobbling speed, surface characteristics of the sheathing, or other parameters will need to be adjusted. For example, the segmented ceramic sheathing discussed above can provide an enhanced level of abrasion where this proves necessary to control scale accumulation on the surface 7a. The removal of scale is quite important since it increases the resistance of the wobble tube to heat transfer which, of course, reduces the efficiency of the apparatus.

While the whip rod has been described as fixed against rotation and as having a generally circular cross section, other arrangements are possible with certain loss of performance. For example, rather than the cable sections 504' and 504" acting in cooperation with the flange 503 and the stiffener 505 as a universal joint, it is possible to use a conventional universal joint to couple the lower end of the whip rod to the base. Also, while the whip rod is described as anchored against rotation, a rotating coupling 503 can be used. This coupling can be as simple as inserting the lower end of the whip rod into a larger diameter hole 503' drilled in the base or formed by a circular flange secured on the base. The disadvantage here is that only one side of the whip rod engages the fluid stream and the surface 7a. As a result, the rod does not wear evenly. However, this arrangement does lend itself to the use of whip rods with noncircular cross sections. For example, the whip rods may have a square cross section with one or two edges that form the film 515 and remove scale from the surface 7a.

Figure 9:
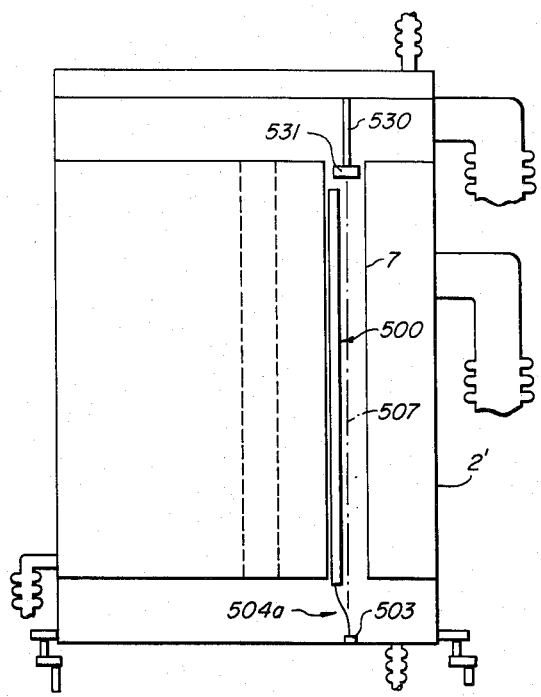
FIG. 9 is a simplified view in vertical section of a "center mounted" whip rod system of the general type shown in FIGS. 6-8 but where the tubes are an integral part of a cannister that undergoes a wobbling motion.

FIG. 9 shows an arrangement where the root of the whip rod is anchored at the base plate at or near the center line 507 of the tube. In this arrangement the tube and the tank 2' are built as an integral unit and wobble in unison. The wobbling drive and the flexible coupling are shown schematically since they are like those described in the aforementioned U.S. Pat. No. 4,230,529.

For dynamic balancing four similar systems may be mounted on the same frame work as shown in FIG. 4 of U.S. Pat. No. 4,230,529. An alternative arrangement is to balance against other dead weight such as a set of counterweights or the weight of the container. Regardless of what balancing arrangement is chosen, with an integral tube and tank each whip rod is "tube centered" on its associated tube.

This arrangement is conducive to the use of a water distribution tube 530 that is also center mounted and has a distribution head 531 driven to rotate by the revolving centrifugal force of the wobbling motion. This fluid distributor requires that it be mounted on a member, here the container 2', that wobbles in unison with the tubes 7. Each fluid distributor is therefore always centered on an associated one of the tubes 7 and the centrifugal force developed by the wobbling motion is used to throw the fluid to the inside wall of the tube farthest from the wobbling center. This is also the location of the whip rod during wobbling. This arrangement therefore introduces the water to the tube in a manner that cooperates with the whip rod to produce the thin film 515 in an efficient manner with a minimum of transition effects as the fluid stream reorients itself on the tube wall or moves over the tube wall to the whip rod. Another significant aspect of this fluid distributor is that there is no mechanical coupling between the distribution system and the wobbling tube, as for example the lower end of the tube 18 which is captured in the opening 20 (FIGS. 1 and 2) to drive the tube 18 to rotate in coordination with the wobbling motion of the tube. This and other mechanical couplings have various disadvantages, principally wear and the requirement for manufacturing to close tolerances. As compared to the FIGS. 1 and 2 arrangement, the present fluid distribution system 530, 531 also avoids the need for the bearing 19.

Figure 10:
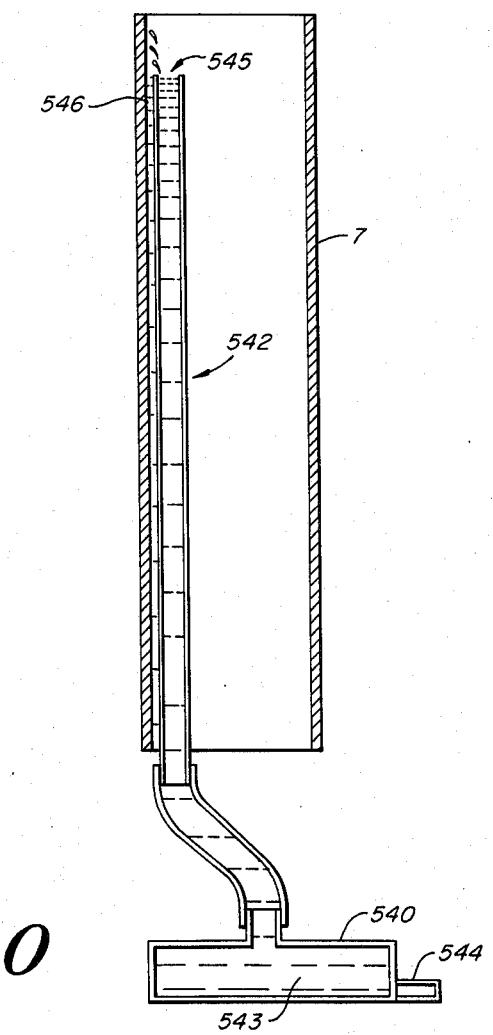
FIG. 10 is a simplified view in vertical section corresponding generally in FIG. 6 where a hollow whip rod is part of the fluid distribution system.

FIG. 10 shows an alternative embodiment of this invention where a hollow whip rod also functions as an input fluid distribution nozzle. At the base of the system there is the fluid supply tank 540 with main supply line 544. Fluid 543 in tank 540 is under a pressure that forces a flow upwardly through the hollow whip rod 542 and out at the top end 545 of the tube. The centrifugal force of the revolving tube will throw this liquid toward the farthermost segment of the wobbling tube where it will flow downwardly along the outside surface of the hollowed whip rod in the form of a stream 546 which is equivalent to the flowstream 6 discussed above. The interaction of the whip rod, the tube 7, and the flowstream 546 is the same as described above with respect to FIG. 8.

The combination of whip rod and liquid distribution system eliminates the need for a revolving nozzle and at the same time it eliminates the transition area between the flow pattern that comes out from the nozzle and is then gathered by the whip rod. This situation further improves the efficiency of the apparatus. This combination whip rod and distribution nozzle may be used in either the tube center mounting or wobbling center mounting as described above.

Further, while the invention has been described with respect to a whip rod mounted at its lower end to a base member, it is also possible, although mechanically more complex and more costly, to combine a revolving nozzle such as the tube 18 of FIG. 1 with a flexible whip rod having the construction and operational characteristics of the present invention, as distinct from the rigid bar shown in FIGS. 4 and 5. The tube 18 may be used to carry the revolving support arm 427 of FIG. 4 so that the pivot 426 of arm 427 is concentric with the revolving tube 18. The arm 427 then rotates freely with respect to the revolving nozzle. The design objective is to allow the revolving nozzle and the whip rod to seek each one's own position with respect to the wobbling tube without interfering with each other.

Although certain preferred embodiments have been described, those skilled in the distillation and evaporation art will recognize that appropriate modifications may be made to meet specific applications without departing from the scope of my invention.

Having thus described my invention I claim:

1. In a fluid evaporation apparatus having (i) a reference number, (ii) at least one heat transfer tube aligned about a generally vertical axis adjacent said reference member, (iii) means to drive said heat transfer tube to revolve about a wobbling center on said vertical axis without rotating the transfer tube, and means for directing a stream of said fluid toward the inner surface of said tube, the wobble motion imparted to said tube serving to cause said stream of said fluid to cling to the inner surface of said tube away from the wobbling center and form a revolving flow stream that wipes the inside surface of the tube, the improvement comprising a whip rod that lies within said inner tube surface, said whip rod being flexible to conform to irregularities in said surface when driven against the surface by the centrifugal force developed by the whip rod sliding over said inner surface in response to said wobbling motion, means for anchoring a first end of said whip rod to the reference member near the longitudinal vertical axis of said tube, said anchoring means allowing said whip rod to lie within said tube extending generally vertically against and revolving about said inner surface of said tube during said wobbling to distribute said fluid stream in a higly thin, uniform film over said inner surface, said highly thin film presenting a low heat resistance to facilitate said evaporation.

2. The evaporation apparatus improvement of claim 1 wherein said whip rod has a flexible core and a sheathing surrounding at least the portion of said core lying within said tube.

3. The evaporation apparatus according to claim 1 wherein said whip rod is hollow and further comprising a fluid supply system to supply a specified amount of said fluid to flow into the lower end and out from the upper end of said hollow whip rod so that the sliding movement of said whip rod around said tube distributes said fluid flowing out from the upper end of said whip rod and then flowing down upon said inner surface.

4. The evaporation apparatus improvement according to claim 1 wherein said anchoring means is secured at the upper end of said whip rod to said reference member, whereby the whip rod is held against said inner surface, to revolve with sliding movement over said inner surface.

5. The evaporation apparatus improvement according to claim 1 wherein said anchoring means is below said tube.

6. The evaporation apparatus improvement according to claim 5 wherein said anchoring means fixes said whip rod to said reference member member non-rotationally.

7. The evaporation apparatus improvement according to claim 6 wherein said anchoring means comprises a bendable lower portion of said whip rod that extends from the lower end of said tube to said reference member.

8. The evaporation apparatus improvement according to claim 5 wherein said anchoring means includes a pivotal connection that allows said whip rod to revolve about its own axis with respect to said reference member.

9. The evaporation apparatus improvement according to claim 1 wherein said reference member and said tube are connected to wobble in unison and wherein said anchoring means is secured at said reference member at a point near the vertical centerline of said tube and below said tube.

10. The evaporation apparatus improvement according to claim 9 further comprising fluid distribution means mounted on said reference member at a point above said tube to wobble in coordination with said reference member and said tube.

11. The evaporation apparatus improvement according to claim 10 wherein said fluid distribution means is generally aligned with the centerline of said tube and the centrifugal force developed by said wobbling motion throws said fluid onto said inner surface at a point farthermost from said wobbling center to coordinate with the movement of said whip rod within said tube.

12. The evaporation apparatus improvement according to claim 5 wherein said whip rod is sufficiently stiff to remain within said tube when said tube is not wobbling.

13. In a fluid evaporation apparatus having (i) a reference member (ii) at least one heat transfer tube aligned about a generally vertical axis over said reference member, (iii) means to drive said heat transfer tube about a wobbling center on said vertical axis without rotating the transfer tube, and (iv) means to direct a stream of said fluid toward the inner surface of said tube, the wobble motion imparted to said tube serving to cause said fluid stream to cling to the inner surface of said tube away from the wobbling center and form a revolving flow stream that wipes the inside surface of the tube, the improvement comprising a whip rod that extends from a lower end to said reference member generally upwardly into the interior of said tube, means for non-rotationally anchoring the lower end of said whip rod to said reference member, said anchoring means including means for providing a universal joint connection between the portion of said whip rod that lies within said tube and said reference member, said whip rod portion that lies within said tube extending generally vertically against and rotating about said inner surface of said tube during said wobbling to distribute said fluid stream in a highly thin, uniform film over said inner surface, said highly thin film presenting a low heat resistance to facilitate said evaporation.

14. The evaporation apparatus improvement of claim 13 wherein said whip rod has a flexible core and a sheathing surrounding at least the portion of said core lying within said tube.

15. The evaporation apparatus improvement of claim 14 wherein said core is a metallic cable.

16. The evaporation apparatus improvement of claim 14 wherein said sheathing has a substantially circular cross section to promote a uniform wear of said sheathing.

17. The evaporation apparatus improvement of claim 14 wherein said sheathing over said portion of the whip rod lying within said tube is a continuous tube of a resilient material.

18. The evaporation apparatus improvement of claim 2 wherein said sheathing over said whip rod portion lying within said tube is a set of mutually axially spaced tubular members.

19. The evaporation apparatus improvement according to claim 18 wherein said tubular members are formed of a substantially rigid material.

20. The evaporation apparatus according to claim 14 wherein said universal joint connection means comprises a length of said flexible core extending between said anchoring means and said tube.

21. The evaporation apparatus according to claim 20 wherein said universal joint connection means includes a stiffener for a portion of said length of flexible core.

22. A fluid evaporation apparatus comprising:
a reference member,
at least one heat transfer tube aligned about a generally vertical axis and located over said reference member,
means to drive said heat transfer tube about a wobbling center on said vertical axis without rotating the transfer tube, means to direct a stream of said fluid toward the inner surface of said tube from a point adjacent the upper end of said tube, the wobble motion imparted to said tube serving to cause said fluid stream to cling to the inner surface of said tube away from the wobbling center to form a revolving flow stream that wipes the inner surface of the tube,
a flexible whip rod having a first portion located within said tube and extending generally vertically during said wobbling and in contact with said fluid stream at a point away from the wobble center to form, in cooperation with said inner surface, a highly thin, evenly distributed fluid film on said inner surface,
means for mounting said whip rod at its lower end, said mounting means resisting rotational motion of said whip rod about its own longitudinal axis while allowing said whip rod to slide freely about said inner tube surface in response to said wobbling motion.

23. The evaporation apparatus of claim 22 wherein said mounting means comprises a second portion of said whip rod that extends from the lower end of said tube and means for anchoring the lower end of said second portion non-rotationally to said reference member at a point near a vertical axis that is the center of said wobbling for said tube.

24. The evaporation apparatus according to claim 22 or 23 wherein said whip rod has a flexible core and at least one surrounding sheathing over said first portion.

25. The evaporation apparatus according to claim 24 wherein said core is a metallic cable.

26. The evaporation apparatus according to claim 24 wherein said sheathing located within said tube has a substantially circular cross section to promote a uniform wear of said sheathing.

27. The evaporation apparatus of claim 26 wherein said sheathing located within said tube is a continuous tube of a resilient material.

28. The evaporation apparatus according to claim 24 wherein said sheathing is a series of mutually axially spaced tubular members.

29. The evaporation apparatus according to claim 24 wherein said mounting means includes a stiffener that extends over a portion of said flexible core between said anchoring means and said tube while allowing the unstiffened portions of said flexible core to act as a universal joint that allows said revolving motion of said whip rod in response to said wobbling motion of said tube.

30. A fluid evaporator apparatus comprising,
a container,
at least one heat transfer tube aligned about a generally vertical axis and mounted within said container in a mutually fixed relationship,
means to drive said container and said heat transfer tube about generally vertical wobbling axis without rotating the transfer tubes or the container,
fluid distribution means for distributing said fluid mounted on said container at a fixed location that is generally centered on said tube and wobbles in unison with said container and said tube, said fluid distribution means including a fluid outlet disposed within said tube at its upper end so that said fluid outlet is urged by the centrifugal force of said wobbling motion to revolve with the wobbling motion and to discharge said fluid onto the inner surface of said tube at a point farthermost from said wobbling axis.

* * * * *